(12) United States Patent
Yu et al.

(10) Patent No.: US 11,272,253 B2
(45) Date of Patent: Mar. 8, 2022

(54) VIDEO PUSHING METHOD, APPARATUS, DEVICE AND STORAGE MEDIUM

(71) Applicant: Baidu Online Network Technology (Beijing) Co., Ltd., Beijing (CN)

(72) Inventors: Jingwen Yu, Beijing (CN); Hao Liang, Beijing (CN); Bingbing Fan, Beijing (CN)

(73) Assignees: Baidu Online Network Technology (Beijing) Co., Ltd., Beijing (CN); Shanghai Xiaodu Technology Co. Ltd., Shanghai (CN)

( * ) Notice: Subject to any disclaimer, the term of this patent is extended or adjusted under 35 U.S.C. 154(b) by 4 days.

(21) Appl. No.: 16/667,993

(22) Filed: Oct. 30, 2019

(65) Prior Publication Data

US 2020/0221182 A1    Jul. 9, 2020

(30) Foreign Application Priority Data

Jan. 3, 2019   (CN) .......................... 201910004507.7

(51) Int. Cl.
*H04N 21/466* (2011.01)
*H04N 21/45* (2011.01)
*H04N 21/442* (2011.01)
*H04N 21/431* (2011.01)
*H04N 21/81* (2011.01)
(Continued)

(52) U.S. Cl.
CPC ....... *H04N 21/4668* (2013.01); *H04N 21/433* (2013.01); *H04N 21/4312* (2013.01); *H04N 21/4394* (2013.01); *H04N 21/44204* (2013.01); *H04N 21/4532* (2013.01); *H04N 21/482* (2013.01); *H04N 21/8126* (2013.01)

(58) Field of Classification Search
None
See application file for complete search history.

(56) References Cited

U.S. PATENT DOCUMENTS

| 2013/0086082 | A1 | 4/2013 | Park et al. |
| 2014/0089238 | A1* | 3/2014 | Saito ................... G06F 3/04847 706/12 |

(Continued)

FOREIGN PATENT DOCUMENTS

| CN | 103500215 A | 1/2014 |
| CN | 103699603 A | 4/2014 |

(Continued)

*Primary Examiner* — Omar S Parra
(74) *Attorney, Agent, or Firm* — Harness, Dickey & Pierce, P.L.C.

(57) ABSTRACT

Provided are a video pushing method, an apparatus, a device, and a storage medium. In an embodiment of the present disclosure, the number of times a user page is displayed on a user terminal is obtained; if the number of times is less than a preset value, a target video to be pushed to the user terminal is determined according to a popularity of a video in a storage system corresponding to a server; if the number of times is greater than a preset value, a target video to be pushed to the user terminal is determined according to feature information of a user and feature information of a video in the storage system corresponding to the server. Accordingly, the server can continuously push videos that meet the user's needs to the user terminal while the user is using the user page, thereby improving the user experience.

20 Claims, 6 Drawing Sheets

(51) Int. Cl.
*H04N 21/439* (2011.01)
*H04N 21/482* (2011.01)
*H04N 21/433* (2011.01)

(56) References Cited

U.S. PATENT DOCUMENTS

2014/0280472 A1* 9/2014 Riviello ................. H04L 67/02
709/203
2015/0121306 A1* 4/2015 Fundament ........... G06F 3/0482
715/811

FOREIGN PATENT DOCUMENTS

| CN | 103870454 A | 6/2014 |
| CN | 106844680 A | 6/2017 |
| CN | 107249145 A | 10/2017 |
| CN | 108052591 A | 5/2018 |
| CN | 108419134 A | 8/2018 |

* cited by examiner

VIDEO PUSHING METHOD, APPARATUS, DEVICE AND STORAGE MEDIUM

CROSS-REFERENCE TO RELATED APPLICATION

This disclosure claims priority to Chinese Patent Application No. 201910004507.7, filed on Jan. 3, 2019, which is hereby incorporated by reference in its entirety.

FIELD

Embodiments of the present disclosure relate to the field of computer technologies and, in particular, to a video pushing method, an apparatus, a device and a storage medium.

BACKGROUND

In the prior art, a television (TV) box may be installed on a TV, and a user can watch network resources such as online movies, TV dramas and the like on the TV through the TV box.

However, when the user watches the network resources on the TV through the TV box, the network resources on the TV homepage for the user to select are limited, and the user needs to repeatedly browse the homepage to find a video that he or she likes, which harms user experience.

SUMMARY

Embodiments of the disclosure provides a video pushing method, an apparatus, a device and a storage medium, so that a server can continuously push videos that meet a user's needs to a user terminal while the user is using a user page, thereby improving the user experience.

In a first aspect, an embodiment of the present disclosure provides a video pushing method, including:

obtaining a number of times a user page is displayed on a user terminal, where the user page is used to display a video pushed from a server;

if the number of times is less than a preset value, determining a target video to be pushed to the user terminal according to a popularity of a video in a storage system corresponding to the server;

if the number of times is greater than a preset value, determining a target video to be pushed to the user terminal according to feature information of a user and feature information of a video in the storage system corresponding to the server.

Optionally, the determining a target video to be pushed to the user terminal according to feature information of a user and feature information of a video in the storage system corresponding to the server includes:

if feature information of a video in the storage system corresponding to the server matches the feature information of the user, determining the video to be the target video that matches the feature information of the user in the storage system; and pushing the target video to the user terminal corresponding to the user.

Optionally, the feature information of the video is determined according to the video and related information of the video, and the related information of the video includes at least one of the following:

a poster of the video, and a title of the video.

Optionally, the feature information of the user is determined according to attribute information of the user, and the attribute information of the user includes at least one of the following:

a basic attribute of the user, a behavior attribute of the user, and a prediction attribute of the user.

Optionally, the popularity of the video includes at least one of the following:

a hotness of the video, and a timeliness of the video.

Optionally, the method further includes:

obtaining a voice control instruction of the user; and pushing the target video to the user terminal according to the voice control instruction.

In a second aspect, an embodiment of the present disclosure provides a video pushing apparatus, including:

an obtaining module, configured to obtain a number of times a user page is displayed on a user terminal, where the user page is used to display a video pushed from a server; and a determining module, configured to: if the number of times is less than a preset value, determine a target video to be pushed to the user terminal according to a popularity of a video in a storage system corresponding to the server; if the number of times is greater than a preset value, determine a target video to be pushed to the user terminal according to feature information of a user and feature information of a video in the storage system corresponding to the server.

Optionally, the determining module is specifically configured to, when determining a target video to be pushed to the user terminal according to feature information of a user and feature information of a video in the storage system corresponding to the server:

if feature information of a video in the storage system corresponding to the server matches the feature information of the user, determine the video to be the target video that matches the feature information of the user in the storage system; and the video pushing apparatus further includes: a sending module, configured to push the target video to the user terminal corresponding to the user.

Optionally, the feature information of the video is determined according to the video and related information of the video, and the related information of the video includes at least one of the following:

a poster of the video, and a title of the video.

Optionally, the feature information of the user is determined according to attribute information of the user, and the attribute information of the user includes at least one of the following:

a basic attribute of the user, a behavior attribute of the user, and a prediction attribute of the user.

Optionally, the popularity of the video includes at least one of the following:

a hotness of the video, and a timeliness of the video.

Optionally, the obtaining module is further configured to:

obtain a voice control instruction of the user; and push the target video to the user terminal according to the voice control instruction.

In a third aspect, an embodiment of the present disclosure provides a server, including:

a memory;

a processor; and a computer program, where the computer program is stored in the memory, and is configured to be executed by the processor to implement the method according to the first aspect.

In a fourth aspect, an embodiment of the present disclosure provides a computer readable storage medium, storing thereon a computer program which, when executed by a processor, implements the method according to the first aspect.

Using the video pushing method, apparatus, device, and storage medium provided by the embodiments of the present disclosure, the number of times a user page is displayed on a user terminal is obtained; if the number of times is less than a preset value, a target video to be pushed to the user terminal is determined according to a popularity of a video in a storage system corresponding to a server; if the number of times is greater than a preset value, a target video to be pushed to the user terminal is determined according to feature information of a user and feature information of a video in the storage system corresponding to the server. Accordingly, the server can continuously push videos that meet the user's needs to the user terminal while the user is using the user page, thereby improving the user experience.

Specific embodiments of the present disclosure have been shown by the drawings described above, which will be described in more detail later. The drawings and the textual descriptions are not intended to limit the scope of the present disclosure in any way. Rather, they are designed to explain the concepts of the present disclosure to those skilled in the art by referring to the specific embodiments.

DETAILED DESCRIPTION OF THE EMBODIMENTS

Exemplary embodiments will be described in detail herein, examples of which are illustrated in the accompanying drawings. Unless indicated otherwise, the following description refers to the same or similar elements in different drawings using the same or similar numerals. The embodiments described in the following exemplary embodiments do not represent all embodiments consistent with the present disclosure. Rather, they are merely examples of apparatuses and methods consistent with some aspects of the present disclosure as detailed in the appended claims.

Figure 1:
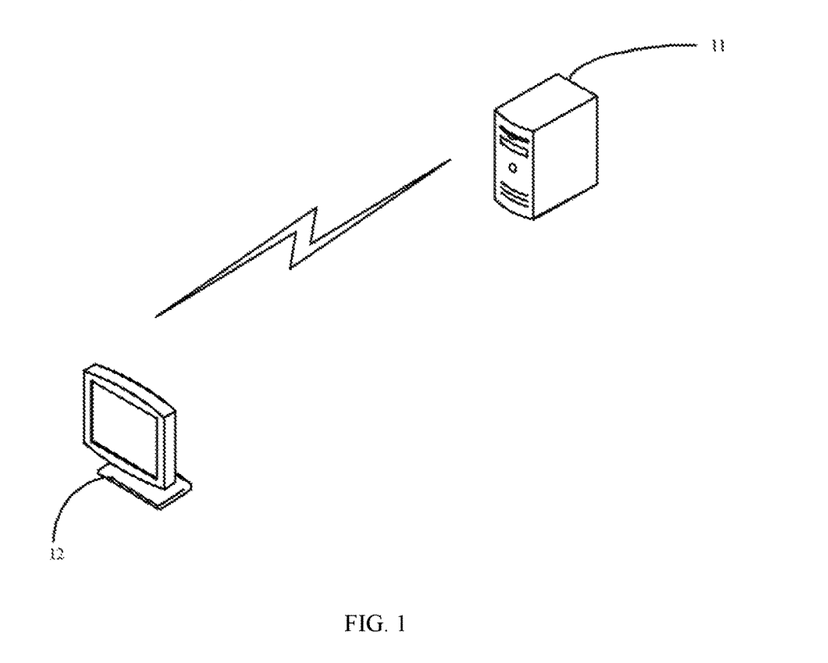
FIG. 1 is a schematic diagram of an application scenario according to an embodiment of the present disclosure.

A video pushing method provided by an embodiment of the present disclosure may be applied to a communication system shown in FIG. 1. As shown in FIG. 1, the communication system includes a server 11 and a terminal device 12. The server 11 may be a cloud-end server, also known as a cloud server, which is a cluster of servers that includes many servers. Similar to commonly used computer architectures, the cloud-end server includes a processor, a hard disk, a memory, a system bus, and so on. The terminal device 12 may be a user terminal, such as a computer, a mobile phone, a tablet, or a TV. In this embodiment, a TV is taken as an example for illustration.

The video pushing method provided by the embodiment of the present disclosure is intended to solve the above technical problem of the prior art.

The technical solutions of the present disclosure and how the technical solutions of the present application solve the above technical problems will be described in detail below with reference to specific embodiments. The following specific embodiments may be combined with each other, and the same or similar concepts or processes may be omitted in some embodiments. Embodiments of the present disclosure will be described below with reference to the accompanying drawings.

Figure 2:
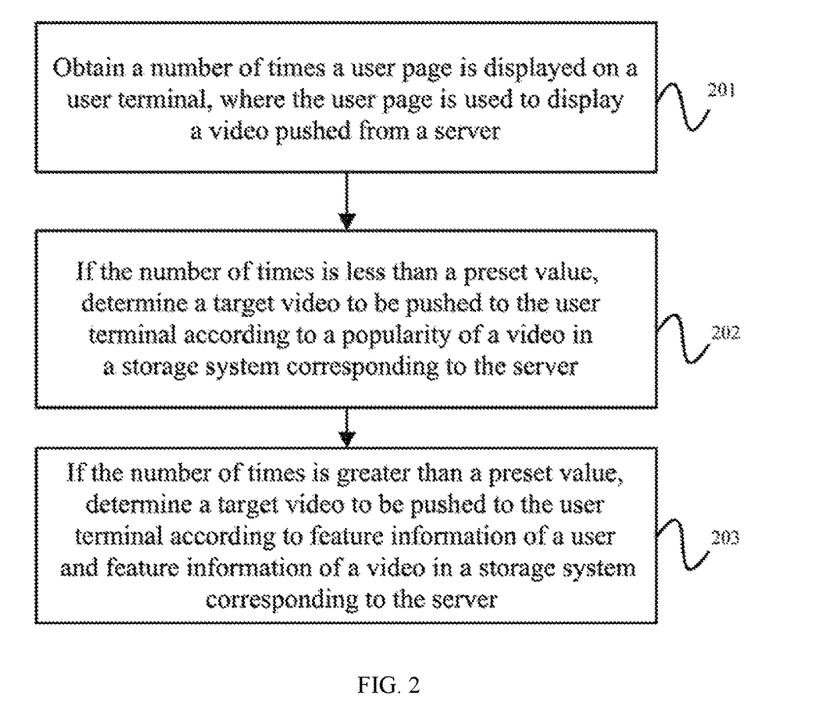
FIG. 2 is a flowchart of a video pushing method according to an embodiment of the present disclosure.

FIG. 2 is a flowchart of a video pushing method according to an embodiment of the present disclosure. The embodiment of the present disclosure provides a video pushing method for the above technical problem in the prior art. The specific steps of the method are as follows:

Step 201, obtain a number of times a user page is displayed on a user terminal, where the user page is used to display a video pushed from a server.

Figure 3:
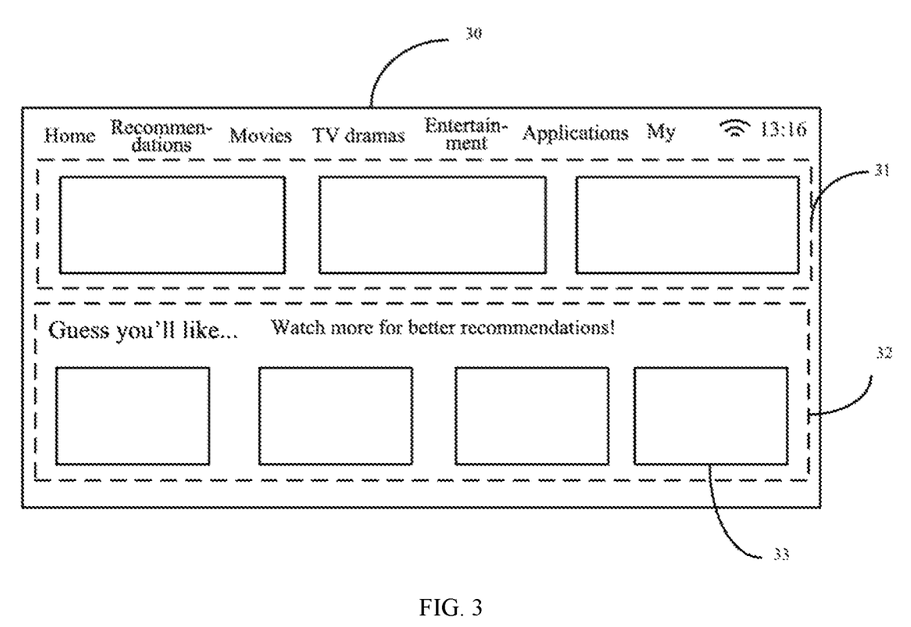
FIG. 3 is a schematic diagram of a user page according to an embodiment of the present disclosure.

In this embodiment, the user page may be a user interface on a TV screen. As shown in FIG. 3, a numeral "30" represents a current page on the TV screen, where the current page may be a homepage on which related information of videos pushed from the server to the user is displayed. Optionally, the related information of a video includes at least one of the following: a type to which the video belongs, a poster of the video, a title of the video, and author information of the video.

In this embodiment, the server can push various types of videos to the user, for example, short videos, long videos, small videos, etc., where the long videos refer to movies, TV dramas, entertainment, animations, documentaries, etc., the short videos refer to videos other than long videos, and the small videos refer to short videos that can be played on a portrait screen. Moreover, in other embodiments, the server is not limited to pushing videos to the TV, but can also push music, audio, and the like to the TV.

As shown in FIG. 3, the current page 30 includes an area 31 and an area 32. Optionally, different areas can display related information of different types of videos. For example, the area 31 displays related information of one type of video and the area 32 displays related information of another type of video. In this embodiment, an area may be referred to as a module. For example, the area 31 may be referred to as a head pushing module, and the area 32 may be referred to as a short video personalization module. That is, a video pushed in the area 31 is a highlight video, and the video pushed in the area 32 is a personalized short video. The highlight video may be a video that the server selects from the Internet and pushes according to the user's historical behavior information. The personalized short video may be a video that the server pushes according to the user's historical behavior information.

In some embodiments, an area includes a plurality of sub-areas, each sub-area for displaying information related to at least one video. As shown in FIG. 3, the area 31 includes a plurality of sub-areas, and so is the area 32, where the sub-area 33 is within the area 32. In this embodiment, one sub-area can display related information of one video. Or, one sub-area can display related information of multiple videos. For example, one sub-area can display related information of a video album. It is understandable that one video album may include multiple videos, and one video album may be a collection of multiple related videos. In this embodiment, a sub-area may be referred to as a card position, and at least one row of card positions may be included in one module.

In this embodiment, the server can classify videos in its corresponding storage system into different types of videos. Further, the server can push the different types of videos to the TV, so that the TV displays related information of the different types of videos on the current page. As described above, related information of the same type of videos is displayed in the same module on the current page. Optionally, modules that may be displayed on the current page, i.e., the homepage are as follows: a head recommendation module, a short video personalization module, a small video personalization module, an album personalization module, an author personalization module, and a my subscription module, a my favorite module, a hottest module, a latest module, an infinitely pull-down short video personalization module.

Figure 4:
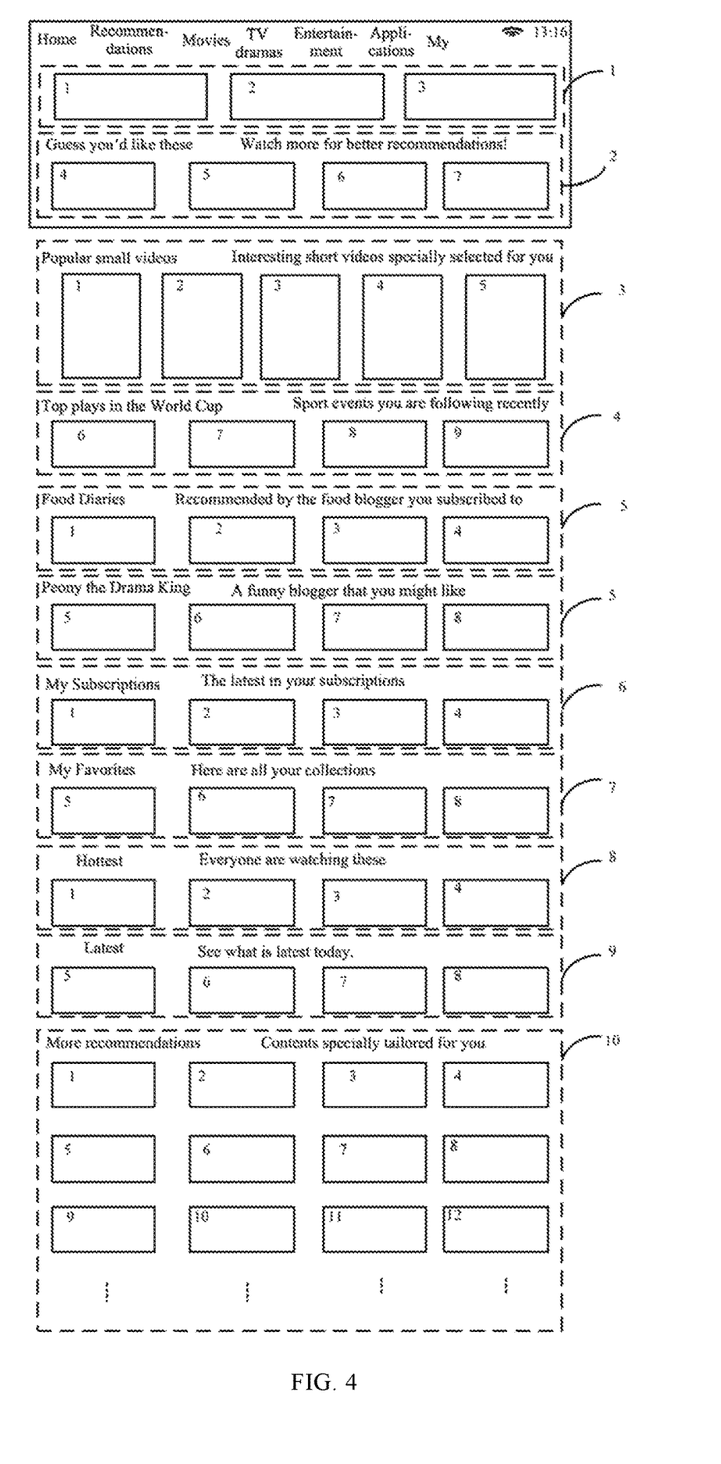
FIG. 4 is a schematic diagram of another user page according to an embodiment of the present disclosure.

As shown in FIG. 4, the module 1 corresponds to the head recommendation module, the module 2 corresponds to the short video personalization module, the module 3 corresponds to the small video personalization module, the module 4 corresponds to the album personalization module, the module 5 corresponds to the author personalization module, and the module 6 corresponding to the my subscription module, the module 7 corresponds to the my favorite module, the module 8 corresponds to the hottest module, the module 9 corresponds to the latest module, and the module 10 corresponds to the infinitely pull-down short video personalization module.

For example, the module 1 and the module 2 are displayed on the current page, when the user has browsed to a card position in the last row of the current page, that is, a card position in module 2 and continues to move the selection box downward, the current page will display module 3 and module 4. Similarly, when the user has browsed again to a card position in the last row of the current page, that is, a card position in module 4, and continues to move the selection box downward, the current page will display module 5. This continues until module 10 is displayed on the current page. Optionally, the module 10 may display related information of the videos in N rows, where N may equal to infinity, theoretically, to ensure that the current page can be infinitely pulled downward. In addition, when the current page is refreshed, card labels on the current page are reordered from one. It can be understood that the infinitely pull-down page shown in FIG. 4 is only an example rather than a limitation. In other embodiments, the order of arranging multiple modules is not in any way limited, nor is the number of card positions that may be included in individual modules.

In addition, it should be noted that the term "infinitely pull-down" means the current page keeps coming up with new card positions, i.e., displaying new video related information, rather than displaying card positions that have been displayed in a loop, as the user keeps scrolling down the current page using, e.g., a remote control, a touch mode or a voice control mode.

In this embodiment, when the user browses, clicks, plays, makes subscriptions, and likes a video on the user page, the TV can record behavior information of the user, and send the behavior information of the user to the server. The server can determine feature information of the user according to the behavior information of the user, and further push videos that match the user's preference to the user terminal according to the feature information of the user. That is, as the user uses the user page more frequently, videos that the server pushes to the user will be more in line with the user's preference.

However, when the user initially uses the user page, the server has not yet obtained enough feature information of the user, and hence cannot accurately determine the video that matches the user's preference. Thus, when the user is in early stage of using the user page, the server may push videos to the user according to the popularity of the videos in the storage system corresponding to the server. The storage system may be internal to the server, or may be in another server for storing videos and in communication with the server.

Step 202, if the number of times is less than a preset value, determine a target video to be pushed to the user terminal according to a popularity of a video in the storage system corresponding to the server.

In this embodiment, the number of times the user uses the user page is measured by the number of times the user page is displayed on the user terminal. The more times the user page is displayed on the user terminal, the more times the user uses the user page. The less times the user page is displayed on the user terminal, the less times the user uses the user page. When the number of times the user page is displayed on the user terminal is less than a preset value, it means the user has not used the user page frequently enough for the server to derive feature information of the user. At this time, the server can push a video to the user terminal according to a popularity of the video in the storage system corresponding to the server. Optionally, the popularity of the video may include at least one of the following: a hotness of the video and a timeliness of the video. The hotness of the video may specifically refer to the number of clicks, playbacks, browses, subscriptions or likes the video has received. The timeliness of the video may specifically refer to the time interval between the moment when the video is initially released and the present moment. The smaller the time interval, the higher the timeliness of the video. That is, when the user is in an early stage of using the user page, the server may push a video that is popular and new to the user terminal. In other embodiments, when the user is in an early stage of using the user page, the server may rank videos in the storage system according to the numbers of playbacks or retrievals of the videos to derive a ranking list of the numbers of playbacks or retrievals of the videos. Optionally, the ranking in the resultant ranking lists may be performed according to the number of times from big to small. The server can determine the video to be pushed to the user terminal according to a relevant ranking list. For example, the server may push the top 10 videos in the relevant ranking list to the user terminal.

Step 203, if the number of times is greater than a preset value, determine a target video to be pushed to the user terminal according to feature information of a user and feature information of a video in the storage system corresponding to the server.

When the number of times the user page is displayed on the user terminal is greater than the preset value, it shows that the user has used the user page frequently enough for the server to derive the feature information of the user. In this case, the server can determine the target video to be pushed to the user terminal according to the feature information of the user and the feature information of the video in the storage system corresponding to the server. The feature information of the user may specifically refer to a video type that the user favors. For example, a user may favor entertainment, comedy, and beauty/cosmetics videos. The feature information of the video may specifically refer to the type of the video. For example, a video may be an entertainment video.

The feature information of the video is determined according to the video and the related information of the video. The related information of the video includes at least one of the following: a poster of the video, a title of the video.

The feature information of the user is determined according to attribute information of the user; the attribute information of the user includes at least one of the following: a basic attribute of the user, a behavior attribute of the user, and a prediction attribute of the user. For example, the basic attribute of the user includes the user's gender, age, and so on. The behavior attribute of the user may specifically refer to historical behavior information of the user using the user page, for example, videos that the user has browsed, clicked on, played, subscribed to, or liked on the user page, and historical time information of those activities. The prediction attribute of the user refers to the video that the user may browse, click on, play, subscribe to, or like in the future, as predicted by the server.

In other embodiments, the method also includes: obtaining a voice control instruction of the user, and pushing the target video to the user terminal according to the voice control instruction.

For example, the TV can receive a voice control instruction of the user for controlling the TV to refresh contents on the current user page. The TV can send the voice control instruction to the server, and the server can determine a target video to be pushed to the TV according to the above steps, and then push the target video to the TV.

Thus, using the embodiment of the present disclosure, the number of times a user page is displayed on a user terminal is obtained; if the number of times is less than a preset value, a target video to be pushed to the user terminal is determined according to a popularity of a video in a storage system corresponding to a server; if the number of times is greater than a preset value, a target video to be pushed to the user terminal is determined according to feature information of a user and feature information of a video in the storage system corresponding to the server. Accordingly, the server can continuously push videos that meet the user's needs to the user terminal while the user is using the user page, thereby improving the user experience.

Figure 5:
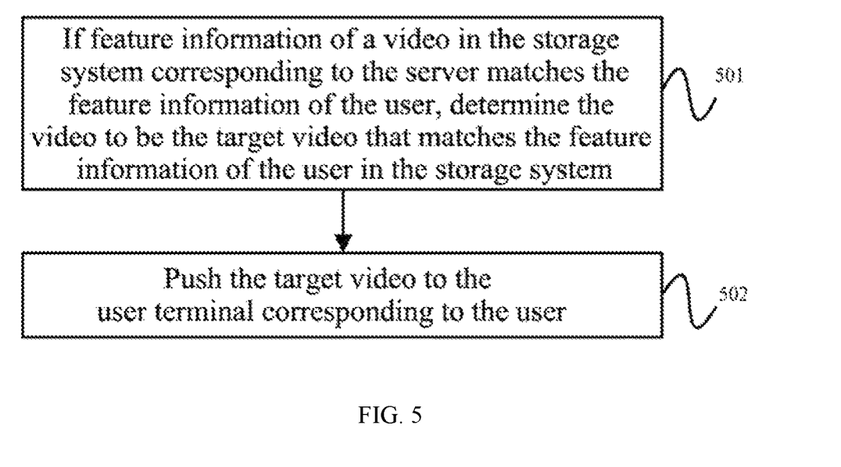
FIG. 5 is a flowchart of a video pushing method according to another embodiment of the present disclosure.

FIG. 5 is a flowchart of a video pushing method according to another embodiment of the present disclosure. On the basis of the above embodiment, the target video to be pushed to the user terminal is determined according to the feature information of the user and the feature information of the video in the storage system corresponding to the server. Specifically, the determination may include the following steps.

Step 501, if feature information of a video in the storage system corresponding to the server matches the feature information of the user, determine the video to be the target video that matches the feature information of the user in the storage system.

Figure 6:
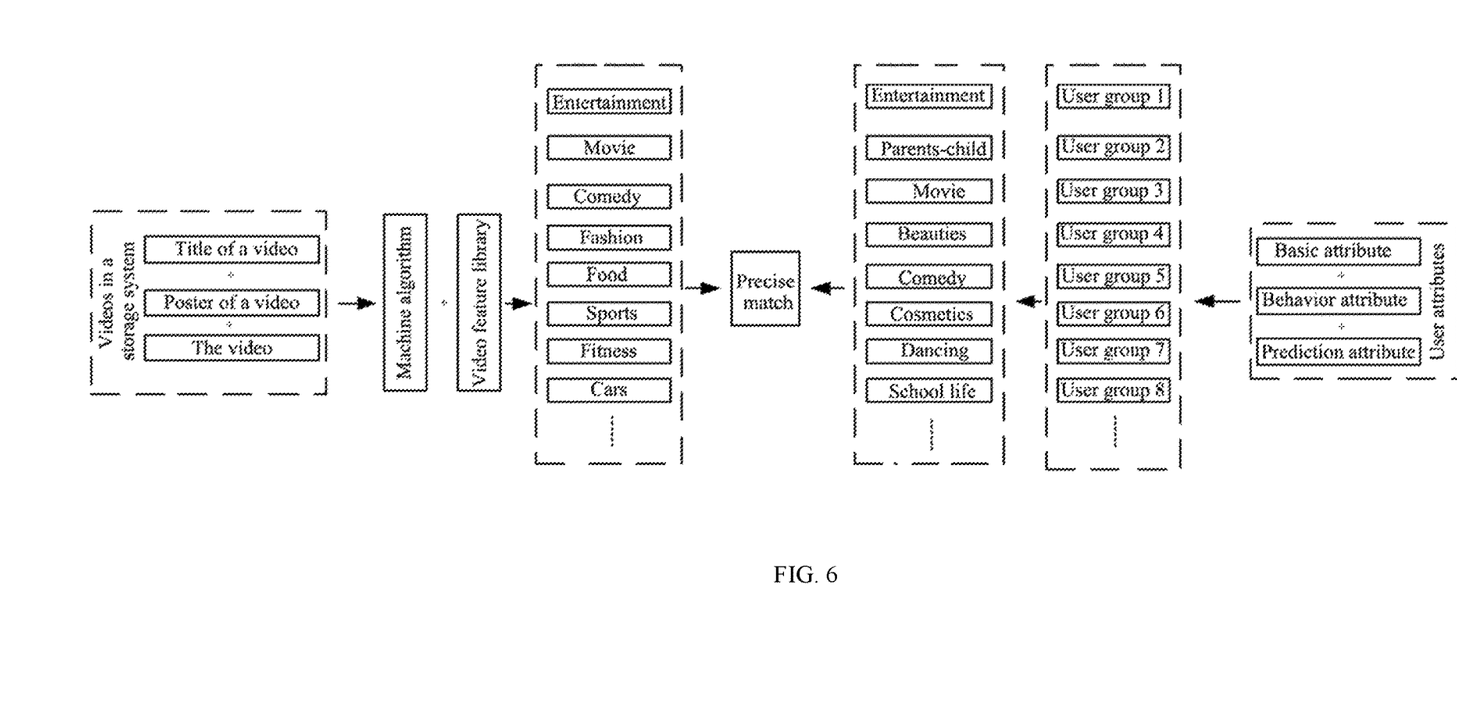
FIG. 6 is a flowchart of a video pushing method according to another embodiment of the present disclosure.

As shown in FIG. 6, each video in the storage system includes: a title of the video, a poster of the video, and the video itself. The feature information of individual videos in the storage system can be determined by a machine algorithm and a video feature library. For example, the feature information included in the video feature library includes: entertainment, movie, comedy, fashion, fine food, sports, fitness, automobile, and so on. The machine algorithm can be used to determine feature information for each video from the video feature library, so that the feature information matching the video is sufficient to describe the type of the video. Optionally, one video may correspond to at least one piece of feature information. In this embodiment, feature information corresponding to each videos may be recorded as a label of the each video. In addition, the label corresponding to each video may further be subdivided into a first-level label and a second-level label. In other embodiments, more levels of labels may be subdivided. For example, "Entertainment" is a first-level label of a video, and a particular performer may be the second-level label corresponding to the video.

As shown in FIG. 6, the server can also obtain attribute information of a large number of users, and attribute information of each user includes: a basic attribute, a behavior attribute, and a prediction attribute, which have been detailed in the above and will not be repeated here again. Further, the server can cluster the large number of users according to the attribute information of the large number of users into, for example, user group 1, user group 2, . . . , user group 8, and so on. Users in a user group may be considered as a group with similar basic attributes, similar behavior attributes, and similar prediction attributes. According to the basic attributes, the behavior attributes and the prediction attributes of the users in the user group, the type of videos favored by the users in this user group can be determined. For example, the users in the user group 1 favor entertainment videos, users in the user group 2 favor parent-child videos, . . . , users in the user group 8 favor school-life videos, and so on. These are merely examples rather than specific limitations. Users in a user group may nevertheless favor other types of videos, too. In this embodiment, the video type that the users in the user group favor in common may also be used as a label for the user group. Further, precise matching is performed on the labels of videos in the storage system with the labels of the user groups to determine whether a label of a video matches a label of a user group, and if it matches, this video can be determined to be the target video in the storage system that matches this user group.

Step 502, push the target video to the user terminal corresponding to the user.

Specifically, the target video is pushed to the user terminal corresponding to the user in the user group.

Thus, using the embodiment of the present disclosure, the number of times a user page is displayed on a user terminal is obtained; if the number of times is less than a preset value, a target video to be pushed to the user terminal is determined according to a popularity of a video in a storage system corresponding to a server; if the number of times is greater than a preset value, a target video to be pushed to the user terminal is determined according to feature information of a user and feature information of a video in the storage system corresponding to the server. Accordingly, the server can continuously push videos that meet the user's needs to the user terminal while the user is using the user page, thereby improving the user experience.

Figure 7:
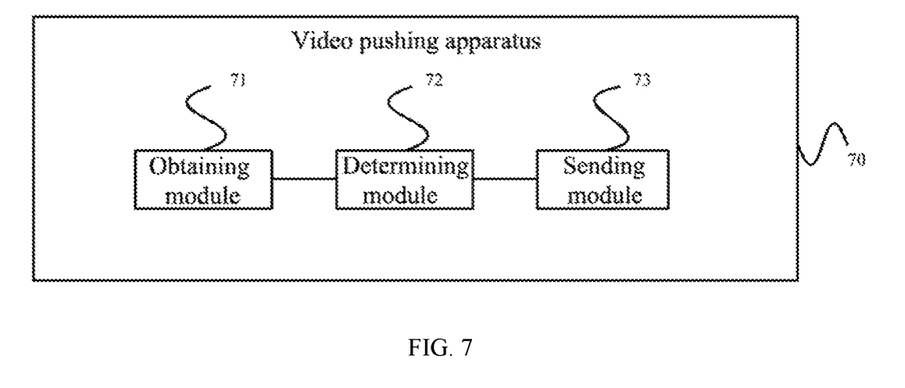
FIG. 7 is a schematic structural diagram of a video pushing apparatus according to an embodiment of the present disclosure.

FIG. 7 is a schematic structural diagram of a video pushing apparatus according to an embodiment of the present disclosure. The video pushing apparatus may specifically be the server according to the foregoing embodiments, or a component (such as a chip or a circuitry) of the server. The video pushing apparatus provided by the embodiment of the present disclosure can perform the process provided by the video pushing method embodiment. As shown in FIG. 7, the video pushing apparatus 70 includes an obtaining module 71 and a determining module 72, where the obtaining module 71 is configured to obtain a number of times a user page is displayed on a user terminal, and the user page is configured to display a video pushed from the server; and the determining module 72 is configured to: if the number of times is less than a preset value, determine a target video to be pushed to the user terminal according to a popularity of a video in a storage system corresponding to the server; if the number of times is greater than a preset value, determine a target video to be pushed to the user terminal according to feature information of a user and feature information of a video in the storage system corresponding to the server.

Optionally, when the determining module 72 determines a target video to be pushed to the user terminal according to feature information of a user and feature information of a video in the storage system corresponding to the server, the module may specifically be configured to: if feature information of a video in the storage system corresponding to the server matches the feature information of the user, determine the video in the storage system to be the target video that matches the feature information of the user. In addition, the video pushing apparatus 70 also includes a sending module 73, which is configured to push the target video to the user terminal corresponding to the user.

Optionally, the feature information of the video is determined according to the video and the related information of the video. The related information of the video includes at least one of the following: a poster of the video, and a title of the video.

Optionally, the feature information of the user is determined according to attribute information of the user, and the attribute information of the user includes at least one of the following: a basic attribute of the user, a behavior attribute of the user, and a prediction attribute of the user.

Optionally, the popularity of the video includes at least one of the following: a hotness of the video, and a timeliness of the video.

Optionally, the obtaining module 71 is further configured to: obtain a voice control instruction of the user. The sending module 73 is further configured to: push the target video to the user terminal according to the voice control instruction.

The video pushing apparatus of the embodiment shown in FIG. 7 may be used to perform the technical solution of the foregoing method embodiments, and the implementation principles and technical effects are similar, whose details will not be described herein again.

Figure 8:
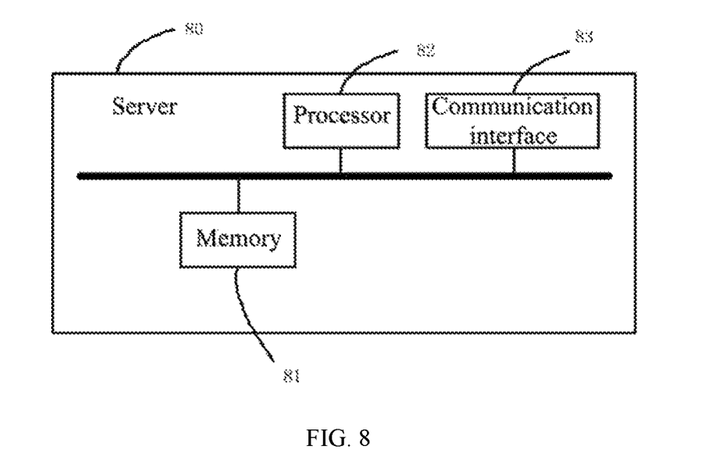
FIG. 8 is a schematic structural diagram of a server according to an embodiment of the present disclosure.

FIG. 8 is a schematic structural diagram of a server according to an embodiment of the present disclosure. The server provided by the embodiment of the present disclosure may perform a process provided by the video pushing method embodiment. As shown in FIG. 8, the server 80 includes: a memory 81, a processor 82, a computer program and a communication interface 83, where the computer program is stored in the memory 81, and is configured to be executed by the processor 82 to implement the video pushing method described in the above embodiments.

The server of the embodiment shown in FIG. 8 may be used to implement the technical solution of the foregoing method embodiments, and the implementation principles and the technical effects are similar, whose details will not be described herein again.

In addition, an embodiment of the present disclosure further provides a computer readable storage medium, on which a computer program is stored, and the computer program is executed by a processor to implement the video pushing method described in the foregoing embodiments.

In the embodiments provided by the present disclosure, it should be understood that the disclosed apparatuses and methods may be implemented in other manners. For example, the apparatus embodiments described above are merely illustrative. For example, the division of units is only a logical function division, and in actual implementation, there may be some other division manners. For example, multiple units or components may be combined or integrated into another system, or some features may be omitted or skipped. In addition, the mutual coupling, direct coupling or communication connection shown or discussed may be an indirect coupling or communication connection through an interface, apparatus or unit, and may be in electrical, mechanical or other forms.

The units described as separate components may or may not be physically separated, and components shown as units may or may not be physical units. That is, they may be located in one place, or may be distributed throughout multiple network units. Some or all of the units may be selected according to actual needs to achieve the purpose of the solutions of the embodiments.

In addition, various functional units in individual embodiments of the present disclosure may be integrated into one processing unit, or individual units may be presented physically separately, or two or more units may be integrated into one unit. The above integrated unit may be implemented either in the form of hardware or in the form of hardware plus software functional units.

The above integrated unit implemented in the form of software functional units may be stored in a computer readable storage medium. The software functional units may, when stored in a storage medium, include instructions for causing a computer device (which may be a personal computer, a server, or a network device, etc.) or a processor to perform part of the steps of the methods described in various embodiments of the present disclosure. The foregoing storage medium includes: a universal serial bus (USB) flash disk, a portable hard disk, a read-only memory (ROM), a random access memory (RAM), a magnetic disk, a compact disk (CD) or other medium that is capable of storing program codes.

A person skilled in the art can clearly understand that the division of functional modules described above are merely illustrations for the convenience and brevity of the description. In practical applications, the above functions may be assigned to different functional modules as needed. That is, the internal structure of the apparatus may be divided into different functional modules to perform all or part of the functions described above. The specific working processes of the apparatuses described above may be found in the corresponding processes in the foregoing method embodiments, whose details will not be described here again.

Finally, it should be noted that the above embodiments are merely intended to illustrate, rather than limit, the technical solutions of the present disclosure. Although the present disclosure has been described in detail with reference to the foregoing embodiments, a person having ordinary skill in the art will understand that the technical solutions described in the foregoing embodiments may still be modified, or some or all of the technical features may be replaced by their equivalents, and such modifications and replacements do not cause the resultant technical solution to depart from the scope of the technical solutions of various embodiments of the present disclosure.

What is claimed is:

1. A video pushing method, comprising:
   obtaining a number of times a user page is displayed on a user terminal, wherein the user page is used to display a video pushed from a server;
   if the number of times the user page being displayed on the user terminal is less than a preset value, determining a target video to be pushed to the user terminal according to a popularity of a video in a storage system corresponding to the server;
   if the number of times the user page being displayed on the user terminal is greater than a preset value, determining a target video to be pushed to the user terminal according to feature information of a user and feature information of a video in the storage system corresponding to the server.

2. The method according to claim 1, wherein the determining a target video to be pushed to the user terminal according to feature information of a user and feature information of a video in the storage system corresponding to the server comprises:
   if feature information of a video in the storage system corresponding to the server matches the feature information of the user, determining the video to be the target video that matches the feature information of the user in the storage system; and
   pushing the target video to the user terminal corresponding to the user.

3. The method according to claim 2, wherein the feature information of the video is determined according to the video and related information of the video; and
   the related information of the video comprises at least one of the following:
   a poster of the video, and a title of the video.

4. The method according to claim 2, wherein the feature information of the user is determined according to attribute information of the user; and
   the attribute information of the user comprises a behavior attribute of the user, wherein the behavior attribute of the user comprises historical behavior information of the user using the user page, and the historical behavior information of the user using the user page comprises a video that the user has browsed, clicked on, played on the user page, and historical time information of the user browsed, clicked on, played the video on the user page,
   the attribute information of the user further comprises at least one of the following:
   a basic attribute of the user and a prediction attribute of the user.

5. The method according to claim 4, wherein the feature information of the video is a label of the video, the server clusters the user according to the attribute information of the user into a user group, and users in the user group are a group of users with similar attribute information, a video type that the users in the user group favor in common is used as a label for the user group, and upon determining that the label of the video in the storage system corresponding to the server matches the label of the user group, the video is determined to be the target video that matches the user group.

6. The method according to claim 1, wherein the popularity of the video comprises at least one of the following:
   a hotness of the video, and a timeliness of the video.

7. The method according to claim 1, further comprising:
   obtaining a voice control instruction of the user; and
   pushing the target video to the user terminal according to the voice control instruction.

8. The method according to claim 1, wherein the user page is a user interface on a television screen.

9. The method according to claim 1, wherein the user page comprises a head pushing area and a short video personalization area, wherein a video pushed in the head pushing area is a highlight video, the highlight video is a video that the server selects from Internet and pushes according to historical behavior information of the user, and the video pushed in the short video personalization area is a personalized short video, and the personalized short video is a video that the server pushes according to the historical behavior information of the user.

10. A video pushing apparatus, comprising:
    a memory;
    a processor; and
    a computer program;
    wherein the computer program is stored in the memory, and is configured to be executed by the processor to:
    obtain a number of times a user page is displayed on a user terminal, wherein the user page is used to display a video pushed from a server; and
    if the number of times the user page being displayed on the user terminal is less than a preset value, determine a target video to be pushed to the user terminal according to a popularity of a video in a storage system corresponding to the server;
    if the number of times the user page being displayed on the user terminal is greater than a preset value, determine a target video to be pushed to the user terminal according to feature information of a user and feature information of a video in the storage system corresponding to the server.

11. The video pushing apparatus according to claim 10, wherein the processor is specifically configured to, when determining a target video to be pushed to the user terminal according to feature information of a user and feature information of a video in the storage system corresponding to the server:
    if feature information of a video in the storage system corresponding to the server matches the feature information of the user, determine the video to be the target video that matches the feature information of the user in the storage system; and
    push the target video to the user terminal corresponding to the user.

12. The video pushing apparatus according to claim 11, wherein the feature information of the video is determined according to the video and related information of the video, and
    the related information of the video comprises at least one of the following:
    a poster of the video, and a title of the video.

13. The video pushing apparatus according to claim 11, wherein the feature information of the user is determined according to attribute information of the user, and
    the attribute information of the user comprises a behavior attribute of the user, wherein the behavior attribute of the user comprises historical behavior information of the user using the user page, and the historical behavior information of the user using the user page comprises a video that the user has browsed, clicked on, played on the user page, and historical time information of the user browsed, clicked on, played the video on the user page,
    the attribute information of the user further comprises at least one of the following:

a basic attribute of the user and a prediction attribute of the user.

14. The video pushing apparatus according to claim 13, wherein the feature information of the video is a label of the video, the server clusters the user according to the attribute information of the user into a user group, and users in the user group are a group of users with similar attribute information, a video type that the users in the user group favor in common is used as a label for the user group, and upon determining that the label of the video in the storage system corresponding to the server matches the label of the user group, the video is determined to be the target video that matches the user group.

15. The video pushing apparatus according to claim 10, wherein the popularity of the video comprises at least one of the following:
   a hotness of the video, and a timeliness of the video.

16. The video pushing apparatus according to claim 10, wherein the processor is further configured to:
   obtain a voice control instruction of the user; and
   push the target video to the user terminal according to the voice control instruction.

17. The video pushing apparatus according to claim 10, wherein the user page is a user interface on a television screen.

18. The video pushing apparatus according to claim 10, wherein the user page comprises a head pushing area and a short video personalization area, wherein a video pushed in the head pushing area is a highlight video, the highlight video is a video that the server selects from Internet and pushes according to historical behavior information of the user, and the video pushed in the short video personalization area is a personalized short video, and the personalized short video is a video that the server pushes according to the historical behavior information of the user.

19. A non-transitory computer readable storage medium, storing thereon a computer program which, when executed by a processor, implements the following:
   obtaining a number of times a user page is displayed on a user terminal, wherein the user page is used to display a video pushed from a server;
   if the number of times the user page being displayed on the user terminal is less than a preset value, determining a target video to be pushed to the user terminal according to a popularity of a video in a storage system corresponding to the server;
   if the number of times the user page being displayed on the user terminal is greater than a preset value, determining a target video to be pushed to the user terminal according to feature information of a user and feature information of a video in the storage system corresponding to the server.

20. The non-transitory computer readable storage medium according to claim 19, wherein the determining a target video to be pushed to the user terminal according to feature information of a user and feature information of a video in the storage system corresponding to the server comprises:
   if feature information of a video in the storage system corresponding to the server matches the feature information of the user, determining the video to be the target video that matches the feature information of the user in the storage system; and
   pushing the target video to the user terminal corresponding to the user.

* * * * *